US012769611B2

(12) United States Patent
Lim et al.

(10) Patent No.: US 12,769,611 B2
(45) Date of Patent: Oct. 20, 2026

(54) CONTROLLER, MEMORY DEVICE AND MEMORY SYSTEM

(71) Applicant: SK hynix Inc., Icheon-si (KR)

(72) Inventors: Jae Il Lim, Icheon-si (KR); Dong Hun Jeong, Icheon-si (KR); Jae Won Chung, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 17 days.

(21) Appl. No.: 18/924,855

(22) Filed: Oct. 23, 2024

(65) Prior Publication Data

US 2025/0383961 A1 Dec. 18, 2025

(30) Foreign Application Priority Data

Jun. 17, 2024 (KR) ........................ 10-2024-0077985

(51) Int. Cl.
*G06F 11/10* (2006.01)

(52) U.S. Cl.
CPC ...... *G06F 11/1068* (2013.01); *G06F 11/1016* (2013.01)

(58) Field of Classification Search
CPC ......................... G06F 11/1016; G06F 11/1068
See application file for complete search history.

(56) References Cited

U.S. PATENT DOCUMENTS 8,589,615 B1 * 11/2013 Keren ................. H04L 49/9021 711/105
2013/0039135 A1 * 2/2013 Kang ................ G11C 11/40611 365/189.16
2015/0049570 A1 * 2/2015 Lee .......................... G11C 8/08 365/230.03
2015/0363287 A1 * 12/2015 Dell .................... G06F 11/1076 714/6.3
2017/0278559 A1 * 9/2017 Hush .................... G11C 7/1012
2022/0121518 A1 * 4/2022 Chung ................ G06F 11/1068

FOREIGN PATENT DOCUMENTS

KR 10-2013-0069364 A 6/2013
WO WO-2016195704 A1 * 12/2016 ........... G06F 12/023

* cited by examiner

*Primary Examiner* — Albert Decady
*Assistant Examiner* — Enamul M Kabir

(57) ABSTRACT

When processing data corresponding to a command, a memory system processes the data by operating at least two banks included in a memory device. The operation of the banks according to the command is distributed, so the number of bits of data provided from a bank in which an error occurs is reduced, and the error may be corrected using a parity of a smaller number of bits.

18 Claims, 8 Drawing Sheets

CONTROLLER, MEMORY DEVICE AND MEMORY SYSTEM

CROSS-REFERENCE TO RELATED APPLICATION

The present application claims priority under 35 U.S.C. § 119(a) to Korean Patent Application No. 10-2024-0077985 filed in the Korean Intellectual Property Office on Jun. 17, 2024, which is incorporated herein by reference in its entirety.

BACKGROUND

1. Technical Field

Embodiments of the present disclosure relate to a controller, a memory device and a memory system.

2. Related Art

A memory system may include at least one memory device that stores data. The memory system may include a controller that performs control associated with the memory device.

For example, the controller may control the basic operation of the memory device. The controller may also perform a function of detecting and correcting an error that occurs while the memory device operates. The operational performance of the memory device may be improved under the control of the controller.

When the memory device operates, an error or a fail without a clear cause may occur. Such a fail may not exhibit a uniform distribution in terms of probability. Due to occurrence of a fail that is difficult for the controller to control, the operational performance of the memory device may degrade.

SUMMARY

Embodiments of the present disclosure are directed to providing measures capable of improving the operational performance of a memory system by improving performance of correction of an error or a fail occurring while a memory device included in the memory system operates.

In an embodiment, a memory system may include: an N (where N is an integer satisfying N≥2) number of memory devices, each memory device including a first bank and a second bank that is paired with the first bank; and a controller configured to read M (where M is an integer satisfying M≥2) bits of first data from the first bank of each of the N number of memory devices, to read M bits of second data from the second bank of each of the N number of memory devices, and to process a codeword of 2·N·M bits, which is configured using the first data and the second data obtained from each of the N number of memory devices.

In an embodiment, a controller may include: a control circuit configured to output a first read command for a first bank included in each of an N (where N is an integer satisfying N≥2) number of memory devices and a second read command for a second bank paired included in each of the N number of memory devices, to pair the second bank and the first bank, and to obtain M (where M is an integer satisfying M≥2) bits of first data corresponding to the first read command and M bits of second data corresponding to the second read command; and an error correction circuit configured to correct an error in the first data obtained from the first bank included in one of the N number of memory devices or the second data obtained from the second bank included in one of the N number of memory devices, using a parity of K (where K is an integer satisfying K≥2) bits included in a codeword of 2·N·M bits, which is configured using the first data and the second data obtained from each of the N number of memory devices.

In an embodiment, a memory device may include: a first bank including a plurality of first word lines, a plurality of first bit lines and a plurality of first memory cells; and a second bank paired with the first bank, and including a plurality of second word lines, a plurality of second bit lines and a plurality of second memory cells, wherein M (where M is an integer satisfying M≥2) bits of first data read from the first bank and M bits of second data read from the second bank are provided in response to a single command.

According to the embodiments of the present disclosure, by stably processing various types of errors or fails occurring while a memory device included in a memory system operates, it is possible to improve the operational performance of the memory system.

DETAILED DESCRIPTION

Figure 1:
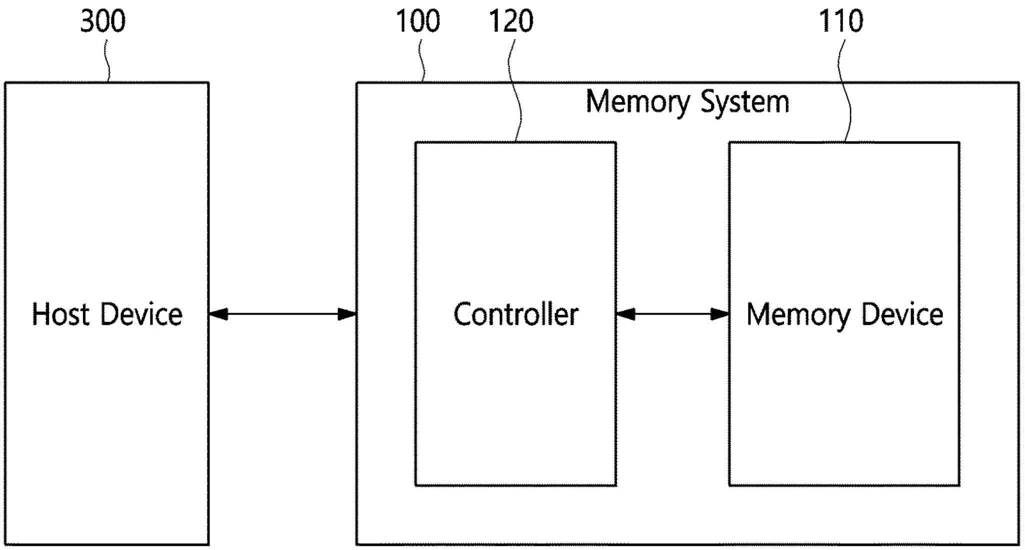
FIG. 1 is a schematic illustration of a memory system according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings. Further, in the following description of examples or embodiments of the present disclosure, detailed descriptions of well-known functions and components incorporated herein will be omitted when it is determined that the description may make the subject matter in some embodiments of the present disclosure more unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, or manufacturing methods, these terms may be used to describe non-consecutive or non-sequential processes or operations unless the term "directly" or "immediately" is used together.

In addition, when any dimensions, relative sizes etc. are mentioned, it should be considered that numerical values for elements or features, or corresponding information (e.g., level, range, etc.) include a tolerance range or error margin that may be caused by various factors (e.g., process factors, internal or external impact, noise, etc.) even when a relevant description is not specified. Further, the term "may" fully encompasses all the meanings of the term "can."

Hereinafter, various embodiments of the present disclosure will be described in detail with reference to accompanying drawings.

FIG. 1 is a schematic illustration of a memory system according to embodiments of the present disclosure.

Referring to FIG. 1, a memory system 100 may include at least one memory device 110. The memory system 100 may include a controller 120 that controls the operation of the memory device 110.

The memory device 110 may be, for example, volatile memory such as DRAM, SDRAM, DDR SDRAM or LPDDR SDRAM, but embodiments of the present disclosure are not limited thereto. The memory device 110 may be nonvolatile memory such as NAND flash memory, 3D NAND flash memory or NOR flash memory.

The memory device 110 may be one of various types of memory such as resistive RAM, phase change memory, magnetoresistive memory, ferroelectric memory or spin transfer torque memory. The memory device 110 may be a processing-in-memory that includes a calculation function or a data processing function.

A controller 120 may control the operation of the memory device 110 on the basis of a command received from the outside. The controller 120 may control the operation of the memory device 110 on the basis of its own command.

The controller 120 may transmit to the memory device 110 a command or an address for controlling the operation of the memory device 110. The controller 120 may control, for example, an operation of writing data to the memory device 110. The controller 120 may control an operation of reading data written to the memory device 110.

Depending on the type of the memory device 110, the controller 120 may control a refresh operation or an erase operation on data written to the memory device 110.

The controller 120 may perform an operation of detecting and correcting an error in data read from the memory device 110. The operation of correcting an error may be performed in the memory device 110.

The controller 120 may control the operation of the memory device 110 on the basis of a command received from an external host device 300.

For example, the host device 300 may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a telematics network, an RFID (radio frequency identification) device, a mobility device (e.g., a vehicle, a robot or a drone) capable of traveling under human control or autonomous driving, or the like. Alternatively, the host device 300 may be a virtual/augmented reality device that provides a 2D or 3D virtual reality image or augmented reality image. In addition to the examples described above, the host device 300 may be any one of various electronic devices that require the memory system 100 capable of storing data for data processing.

The host device 300 may include at least one operating system. The operating system may manage and control overall functions and operations of the host device 300, and may control interoperation between the host device 300 and the memory system 100. The operating system may be classified into a general operating system and a mobile operating system depending on the mobility of the host device 300.

The controller 120 and the host device 300 may be devices that are separated from each other, or the controller 120 and the host device 300 may be implemented by being integrated into one device.

Hereunder, for the sake of convenience in explanation, examples assume that the controller 120 and the host device 300 are devices that are separated from each other.

Figure 2:
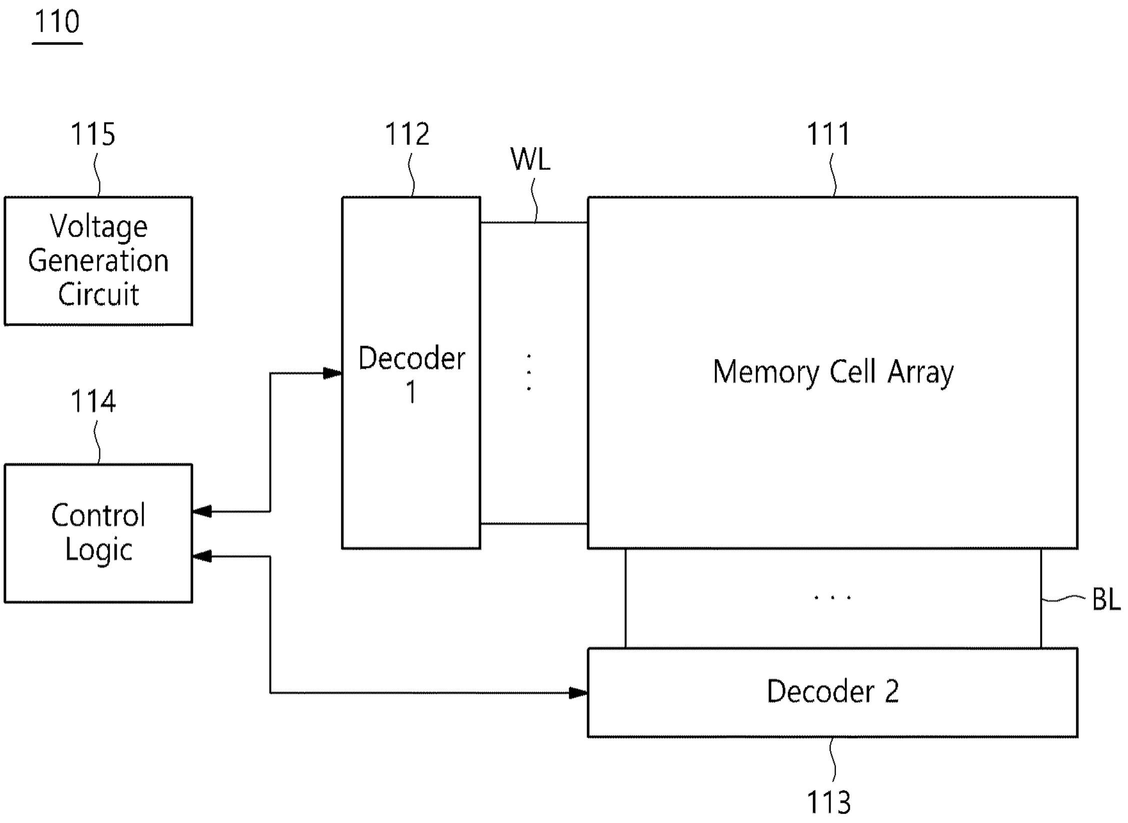
FIG. 2 is a schematic illustration of a memory device according to embodiments of the present disclosure.

FIG. 2 is a schematic illustration of a memory device according to embodiments of the present disclosure.

Referring to FIG. 2, a memory device 110 may include a memory cell array 111 that includes a plurality of memory cells. The memory cell array 111 may include a plurality of word lines WL that are disposed in a first direction. The memory cell array 111 may include a plurality of bit lines BL that are disposed in a second direction intersecting the first direction.

Each word line WL may drive a memory cell, from among the plurality of memory cells, that is disposed in a row as the target of a write operation or a read operation.

Each bit line BL may control the operation of a memory cell, from among the plurality of memory cells, that is disposed in a column as the target of a write operation or a read operation.

The memory device 110 may include at least one decoder for addressing the memory cell array 111.

For example, the memory device 110 may include a first decoder 112 and a second decoder 113. The first decoder 112 and the second decoder 113 may be implemented as a single decoder to be included in the memory device 110.

The first decoder 112 may be referred to as, for example, a row address decoder. The second decoder 113 may be referred to as, for example, a column address decoder.

The first decoder 112 and the second decoder 113 may receive address bits.

Address bits may mean bits that indicate addresses of the targets of a write operation or a read operation. On the basis of the address bits, a memory cell that is the target of a write operation or a read operation, and a word line WL and a bit line BL that drive the corresponding memory cell, may be selected.

Using address bits, the first decoder 112 may select a word line WL as a target for an operation from among the plurality of word lines WL. Similarly, the second decoder 113 may select a bit line BL as an operation target from among the plurality of bit lines BL on the basis of the address bits.

The first decoder 112 and the second decoder 113 may select a word line WL and a bit line BL, respectively, by converting address bits. In other embodiments, a combined decoder may select a word line WL and a bit line BL.

Although not illustrated FIG. 2, a read and write circuit may be disposed between the second decoder 113 and the bit lines BL. The read and write circuit may include a page buffer in which data is stored during a write operation or a read operation. A write operation or a read operation, according to driving of a bit line BL selected by the second decoder 113, may be controlled by the read and write circuit.

The memory device 110 may include at least one address buffer for storing the address bits received from the outside. For example, the memory device 110 may include a row address buffer and a column address buffer. In some embodiments, the row address buffer and the column address buffer may be provided in an integrated form. In some other embodiments, only a part of the row address buffer and the column address buffer may be provided.

The row address buffer may provide row address bits received from the outside to the first decoder 112. In some embodiments, the row address buffer and the first decoder 112 may be implemented in a single form.

The column address buffer may provide column address bits received from the outside to the second decoder 113. In some embodiments, the column address buffer and the second decoder 113 may be implemented in a single form.

The memory device 110 may include a control logic 114 that controls the operations of the memory cell array 111, the first decoder 112 and the second decoder 113. The memory device 110 may include a voltage generation circuit 115 that provides voltages required for the operations of the memory cell array 111, the first decoder 112 and the second decoder 113.

The memory device 110 may select a memory cell as an operation target by performing addressing on the basis of the address bits received from the outside. The memory device 110 may select a word line WL and a bit line BL as operation targets in the memory cell array 111 by using a part or a combination of a plurality of address bits.

The memory device 110 may process a command received from the external host device 300 by driving a memory cell as an operation target. The memory device 110 may divide the memory cell array 111 into predetermined units to operate.

Figure 3:
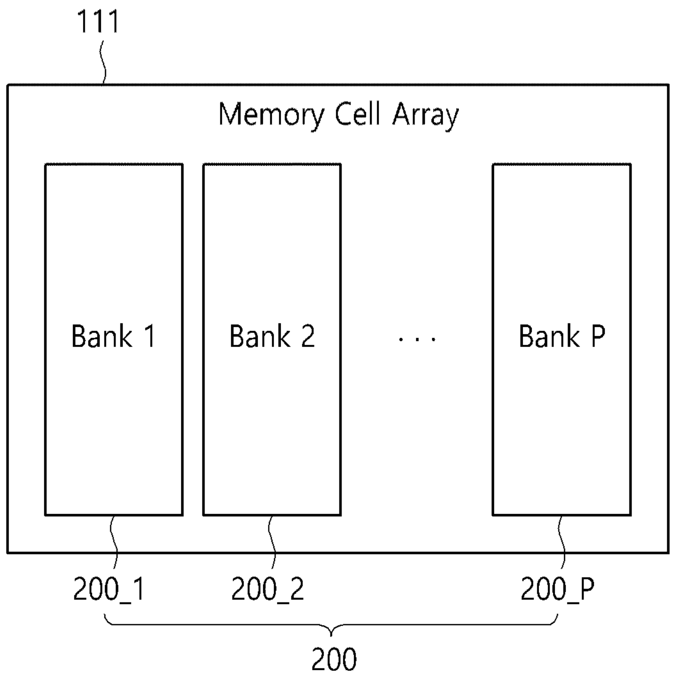
FIG. 3 is a schematic illustration of a memory cell array according to embodiments of the present disclosure.

FIG. 3 is a schematic illustration of a memory cell array according to embodiments of the present disclosure.

Referring to FIG. 3, a memory cell array 111 included in a memory device 110 may be divided into a plurality of banks 200. For example, as illustrated in FIG. 3, the memory cell array 111 of the memory device 110 may include a P number of banks 200_1, 200_2, . . . , and 200_P, where P is an integer satisfying P≥2.

The memory device 110 may drive memory cells in units of banks included in the memory cell array 111.

For example, a bank, from among the plurality of banks 200, as an operation target may be selected by a first decoder 112 and a second decoder 113. The first decoder 112 and the second decoder 113 may select a bank, from among the plurality of banks 200, a word line WL and a bit line BL as operation targets on the basis of address bits received from the outside. At least two banks, from among the plurality of banks 200, may constitute a bank group, and the address bits received from the outside may include bits that indicate a bank group.

The read and write circuit may be disposed consistent with units of a bank, or may be disposed by units of a memory cell array 111 in order to operate on at least two banks, from among the plurality of banks 200, included in the memory cell array 111.

The memory device 110 may perform, in response to a command received from the outside, an operation of writing data to memory cells included in each bank, from among the plurality of banks 200, or reading data written to memory cells included in each bank, from among the plurality of banks 200.

When receiving an active command from the controller 120, in order to operate each bank, the memory device 110 may perform an operation of precharging a bank, from among the plurality of banks 200. The memory device 110 may precharge a bank, from among the plurality of banks 200, as an operation target, and may perform a write operation or a read operation on a memory cell corresponding to a word line WL and a bit line BL indicated by address bits.

The memory device 110 may operate at least two banks, from among the plurality of banks 200, in response to a command received from the controller 120. Depending on the operation mode, the memory device 110 may drive only one bank or may drive at least two banks, from among the plurality of banks 200.

Figure 4:
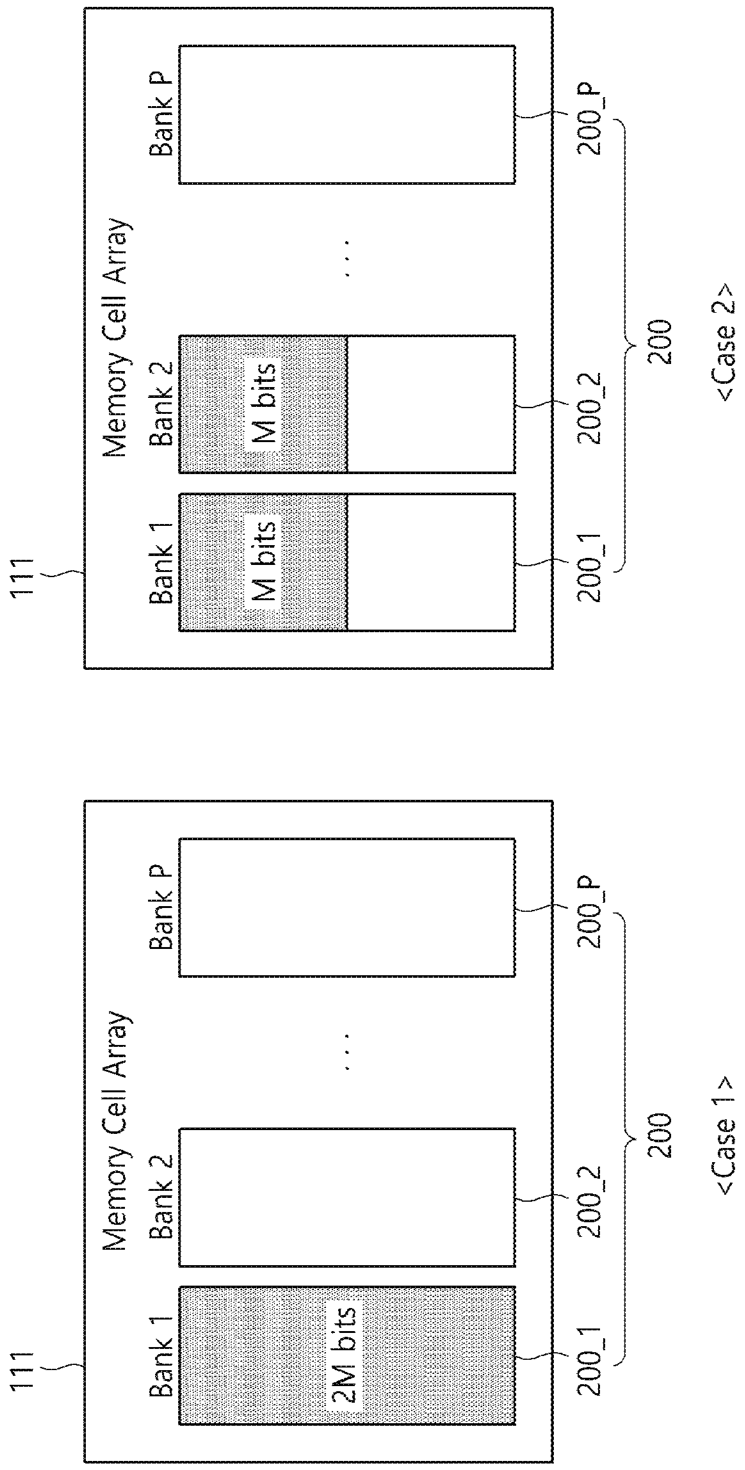
FIG. 4 is a diagram illustrating examples of operating banks according to embodiments of the present disclosure.

FIG. 4 is a diagram illustrating examples of operating banks according to embodiments of the present disclosure.

Referring to FIG. 4, a memory cell array 111 of a memory device 110 may include, for example, a P number of banks 200_1, 200_2, . . . , and 200_P, where P is an integer satisfying P≥2.

The memory device 110 may drive a bank included in a memory cell array 111 according to a command received from a controller 120. The memory device 110 may perform an operation of writing data to a memory cell included in the bank or reading data written to a memory cell included in the bank.

When driving a bank included in the memory cell array 111, the memory device 110 may drive one or at least two banks from among banks 200_1, 200_2, . . . , and 200_P depending on an operating mode.

For example, in <Case 1>, the memory device 110 may operate in a first operation mode. When operating in the first operation mode, the memory device 110 may drive one bank from among banks 200_1, 200_2, . . . , and 200_P in response to a command received from the controller 120.

For example, the memory device 110 may drive a first bank 200_1 according to a command from the controller 120.

The memory device 110 may perform data processing corresponding to bits of a predetermined size according to a command from the controller 120. For example, the memory device 110 may write 2 M (where M is an integer satisfying M≥2) bits of data to the first bank 200_1 or read 2M bits of data from the first bank 200_1 according to a command from the controller 120.

When performing processing of 2 M bit data for the first bank 200_1, the memory device 110 may drive, for example, 2 M number of bit lines BL. The memory device 110 may perform an operation of writing 2 M bits of data or reading 2 M bits of data while driving 2 M number of bit lines BL included in the first bank 200_1.

Since the memory device 110 drives one bank from among banks 200_1, 200_2, . . . , and 200_P in response to a command from the controller 120, power consumption due to driving of the one bank may not be large. The memory device 110 may drive a bank 200 from among banks 200_1, 200_2, . . . , and 200_P that is indicated according to a command from the controller 120, and may perform an operation corresponding to the command.

Alternatively, depending on operation mode, the memory device 110 may perform an operation according to a command from the controller 120 while driving at least two banks, from among banks 200_1, 200_2, . . . , and 200_P, in response to the command.

For example, in <Case 2>, the memory device 110 may operate in a second operation mode.

In the second operation mode, when receiving a command from the controller 120, the memory device 110 may operate at least two banks, from among banks 200_1, 200_2, . . . , and 200_P, in response to the corresponding command. For example, as illustrated in FIG. 4, the memory device 110 may operate two banks, namely a first bank 200_1 and a second bank 200_2.

In other embodiments, the memory device 110 may operate three or at least four banks, from among banks 200_1, 200_2, . . . , and 200_P, in response to a command from the controller 120.

When operating two banks, from among banks 200_1, 200_2, . . . , and 200_P, the memory device 110 may process, by using the two banks, 2 M bits of data, which is the same amount of data processed with only one bank in <Case 1>.

For example, in response to a command from the controller 120, the memory device 110 may write M bits of data to the first bank 200_1 or read M bits of data from the first bank 200_1. In addition, in response to a command from the controller 120, the memory device 110 may write M bits of data to the second bank 200_2 or read M bits of data from the second bank 200_2. Data written to the first bank 200_1 or read from the first bank 200_1 may be referred to as first data, and data written to the second bank 200_2 or read from the second bank 200_2 may be referred to as second data.

The memory device 110 may process 2 M bits of data by operating the first bank 200_1 and the second bank 200_2.

For example, the memory device 110 may perform a processing operation on M bits of data by operating an M number of bit lines BL in the first bank 200_1. The memory device 110 may perform a processing operation on M bits of data by operating an M number of bit lines BL in the second bank 200_2.

Compared to <Case 1>, in <Case 2> a command may be processed by driving bit lines BL corresponding to one out of two banks.

The second operation mode according to <Case 2> may be, for example, a BC8 mode defined in a DRAM-related standard. The memory device 110 according to embodiments of the present disclosure may be implemented to support a first operation mode and a second operation mode.

Since the memory device 110 operates a plurality of banks 200 in response to a single command from the controller 120, the banks in the plurality of banks 200 that perform a data processing operation corresponding to the single command may be distributed. Since the banks that operate according to a single command are distributed, the performance of correcting an error that may occur during the operation of the memory device 110 may be improved.

Figure 5:
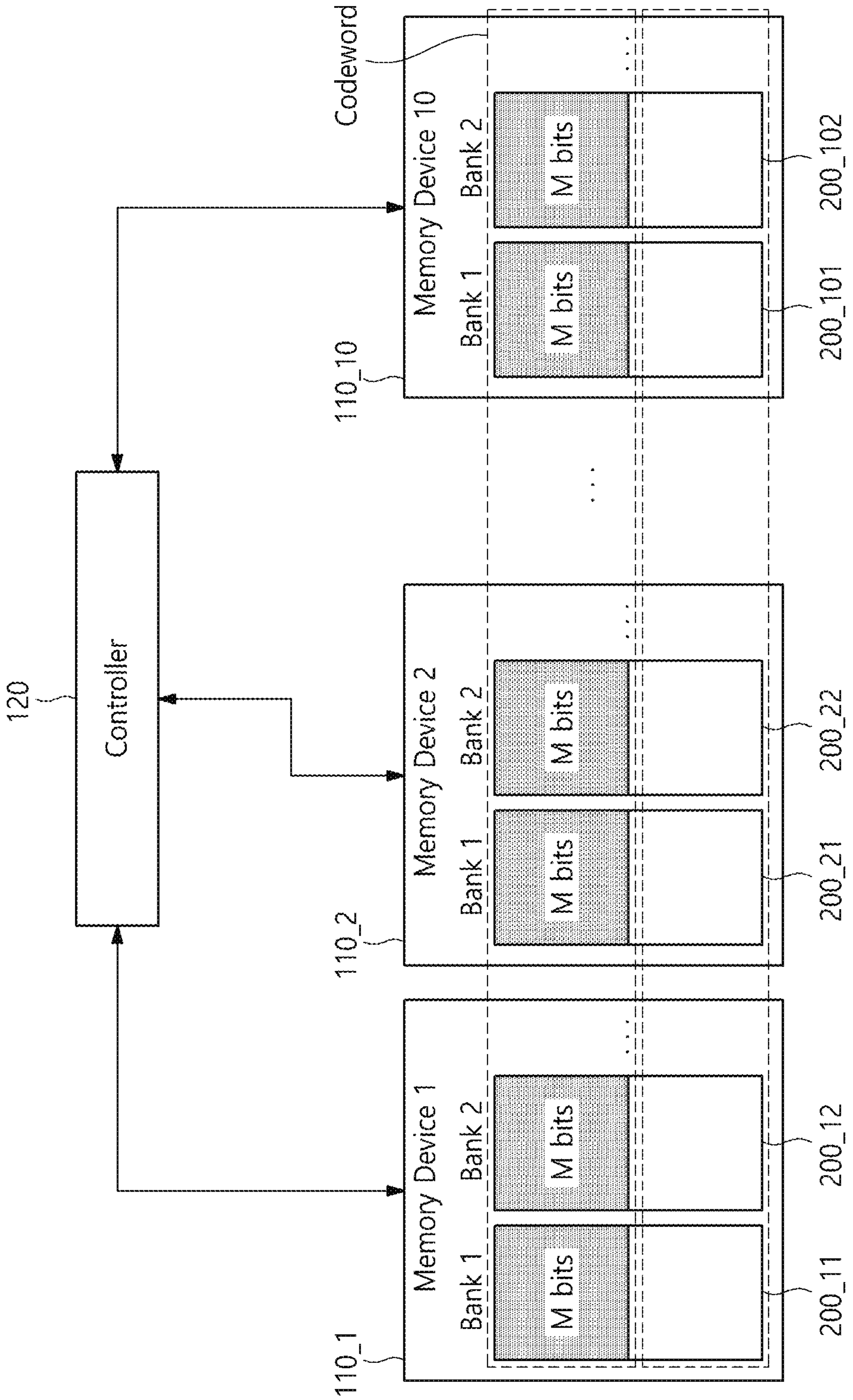
FIG. 5 is a diagram illustrating examples of operating a memory system according to embodiments of the present disclosure.

FIG. 5 is a diagram illustrating examples of operating a memory system according to embodiments of the present disclosure.

Referring to FIG. 5, a memory system 100 may include a plurality of memory devices 110. FIG. 5 illustrates ten memory devices 110_1, 110_2, . . . , and 110_10 included in the memory system 100, but the number of memory devices are not limited to this example. In other embodiments of the present disclosure, the memory system 100 may include one memory device 110.

In addition, embodiments of the present disclosure may be applicable when each memory device 110 included in the memory system 100 is provided in the form of a memory package. A plurality of memories may be included in a memory package, and the memory system 100 may be configured to include a plurality of memory packages.

The memory system 100 may include a controller 120. The controller 120 may control the operations of the memory devices included in the memory system 100.

Each of the memory devices included in the memory system 100 may include a plurality of banks 200. Among the plurality of banks 200 included in each memory device 110, at least two banks may be paired. For example, in FIG. 5, a first bank 200_11 and a second bank 200_12, which are included in a first memory device 110_1, may be paired with each other. A paired state may mean a state in which the paired banks operate together in response to a command from the controller 120.

As in the example illustrated in FIG. 5, a first bank 200_11, 200-21, . . . , 200-101 and a second bank 200_12, 200-22, . . . , 200-102 which are included in each memory device 110_1, 100_2, . . . , 100_10, may be paired with each other. In some embodiments, banks not located adjacent to each other in each memory device 110 may be paired with each other. In addition, in other embodiments three or at least four banks may be paired with one another.

The controller 120 may transmit a command to each memory device 110 to process data according to an external command using the memory device 110.

The memory device 110 may perform a data processing operation according to a command from the controller 120 while operating paired banks in response to the command.

For example, the first memory device 110_1 may perform an operation of processing M bits of data on the first bank 200_11 in response to a command from the controller 120. The first memory device 110_1 may perform an operation of processing M bits of data on the second bank 200_12 in response to the command from the controller 120.

An operation of processing data may mean an operation of writing data to a bank or reading data written to a bank.

For example, in an operation of reading data written to a bank, the first memory device 110_1 may read M bits of data from the first bank 200_11 and read M bits of data from the second bank 200_12. The first memory device 110_1 may provide the 2 M bits of data read from the first bank 200_11 and the second bank 200_12 to the controller 120.

Similarly, a second memory device 110_2 may read M bits of data from a first bank 200_21 and read M bits of data from a second bank 200_22. The second memory device

110_2 may provide the 2 M bits of data read from the first bank 200_21 and the second bank 200_22 to the controller 120.

The controller 120 may receive 20 M bits of data from the ten memory devices 110. When the memory system 100 includes an N (where N is an integer satisfying N≥2) number of memory devices 110, the controller 120 may obtain 2 NM bits of data. The controller 120 may configure a codeword of 2 NM bits and perform processing on the codeword of 2 NM bits.

The codeword of 2NM bits may include, for example, a message and a parity. In addition, the codeword of 2NM bits may include metadata.

The message may correspond to data to be provided by the controller 120 according to a command received from the host device 300. The parity may correspond to data to be used to correct an error when an error occurs in the data corresponding to the message.

The number of bits of the parity may decrease when data other than the message, such as the metadata, is included. Since a codeword is configured using data obtained as the controller 120 drives, in a distributed manner, the banks included in the memory devices 110, error correction may be performed using a parity with a reduced number of bits.

For example, the controller 120 may obtain data by processing the codeword of 2 NM bits based on data read from two banks included in each of the N number of memory devices 110, and may detect and correct an error or a fail that occurs in the data by using the parity.

The parity included in the codeword of 2 NM bits may be, for example, K (where K is an integer satisfying K≥2) bits. For example, K may be greater than two times M as the number of bits of data read from each bank. M may be equal to or smaller than ½ of K.

Since, in the codeword of 2 NM bits, M as the number of bits of data obtained from one bank is equal to or smaller than ½ of K, which is the number of bits of the parity, even when an error occurs in by unit of a bank, the error may be corrected using the parity of K bits. K may be smaller than 4 times M. In this case, the number of banks that operate in each memory device 110 in response to a command from the controller 120 may be 2 as seen in FIG. 5.

By distributing banks that operate in a read operation on the memory device 110, the number of bits of data obtained from each bank 200 may be reduced, and error correction may be possible using the parity.

In addition, since increasing the number of banks that operate is minimized while the number of bits of data obtained from each bank 200 is reduced, increase in power consumption due to operations of the banks may be minimized.

In this way, memory devices 110 according to embodiments of the present disclosure may provide, while operating in a second operation mode, measures capable of configuring and processing a codeword for which error correction by the controller 120 can be performed. When error correction performance becomes equal to or lower than a predetermined level while the memory devices 110 of the memory system 100 operate in a first operation mode, the memory devices 110 of the memory system 100 may change from the first operation mode to a second operation mode. As a result, the error correction performance of the memory system 100 may be improved while preventing unnecessary increases in power consumption.

The scheme in which a codeword is configured by operating two banks included in a memory device 110 may be implemented, for example, by the controller 120 of the memory system 100 or by an operation within the memory device 110.

Figure 6:
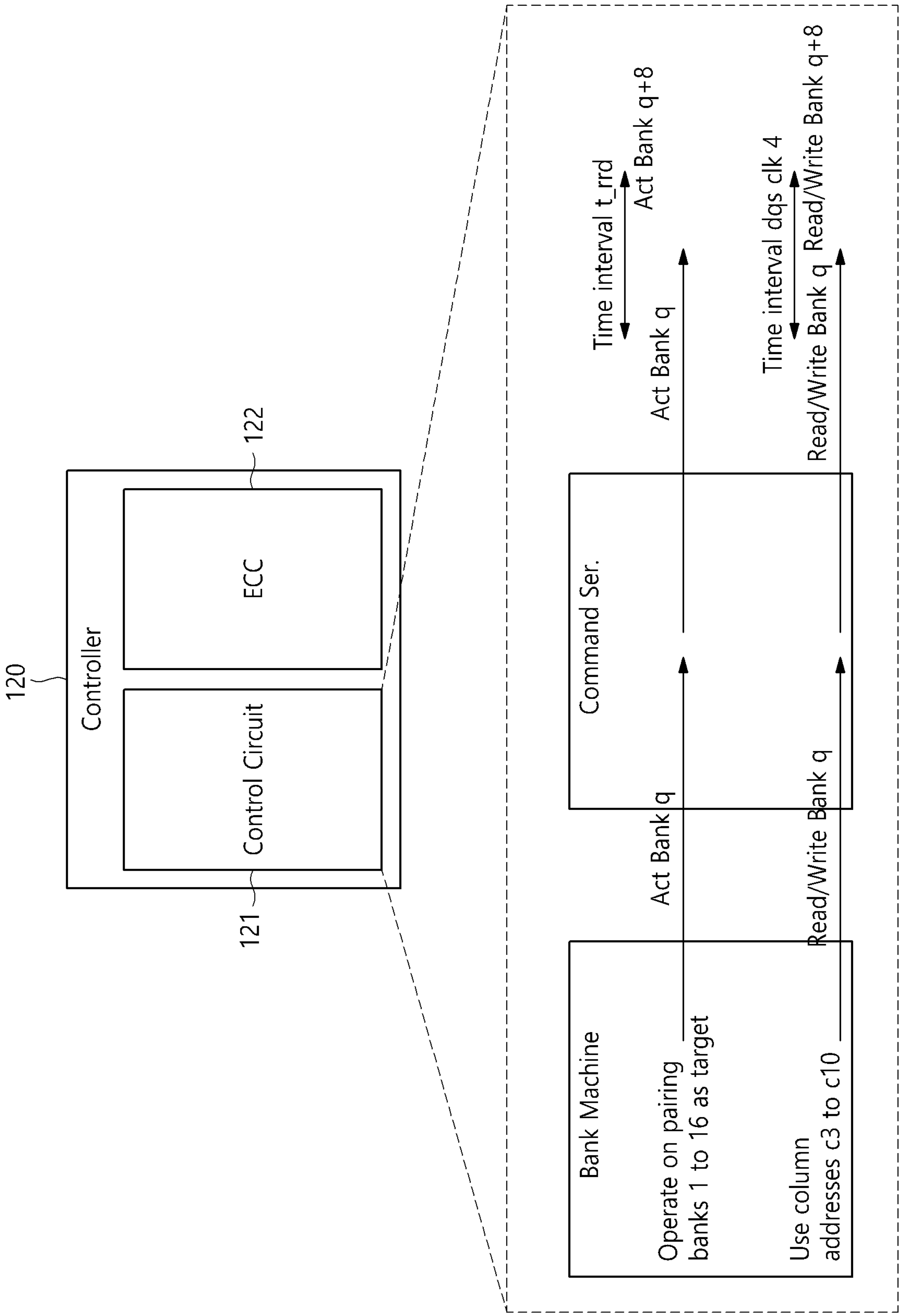
FIG. 6 is a diagram illustrating an example of operating a control circuit in a controller of a memory system according to an embodiment of the present disclosure.

FIG. 6 is a diagram illustrating an example of operating a control circuit in a controller of a memory system according to an embodiment of the present disclosure.

FIG. 6 illustrates a scheme of configuring a codeword by obtaining data from at least two banks included in a memory device 110 in a memory system 100, implemented by a controller 120.

The controller 120 may include, for example, a control circuit 121 and an error correction circuit 122.

The control circuit 121 may output a command for the operation of the memory device 110. The control circuit 121 may determine banks and bit lines to be operated in the memory device 110, for example, through a bank machine. The control circuit 121 may output a command which targets paired banks, from among a plurality of banks 200 included in the memory device 110. The control circuit 121 may indicate a column address which indicates bit lines BL to be operated in each bank, for example, by using c3 to c10 among bits used as a column address. Since the number of bit lines BL to be driven in a second operation mode is smaller than the number of bit lines BL to be driven in a first operation mode, only some of the bits of a column address may be used to indicate bit lines BL.

The control circuit 121 may output active commands for activating banks to be operated in the second operation mode. The control circuit 121 may output commands that instruct write or read operations on the corresponding banks. The control circuit 121 may sequentially output the outputted commands.

For example, the control circuit 121 may output a command for operating a qth bank. The control circuit 121 may output a command for operating a (q+8)th bank after a predetermined time interval. The qth bank and the (q+8)th bank, from among a plurality of banks 200 included in the memory device 110, may be paired banks.

The control circuit 121 may output active commands at predetermined time intervals. For example, the control circuit 121 may output a first active command for the qth bank, and after the predetermined time interval, may output a second active command for the (q+8)th bank.

In addition, the control circuit 121 may output write or read commands at predetermined time intervals. For example, the control circuit 121 may output a first read command for the qth bank, and after a predetermined time interval during which four clock signals are outputted, may output a second read command for the (q+8)th bank.

When reading (or writing) data from (or to) the memory device 110, the control circuit 121 of the controller 120 may control the distribution of the plurality of banks 200 to be operated in the memory device 110, for example by scheduling commands in accordance with a period for operating two banks and outputting two active commands and two read commands (or write commands).

Since the banks in the plurality of banks 200 to be operated are distributed by the control circuit 121, error correction may be improved when a bank has an error.

Figure 7:
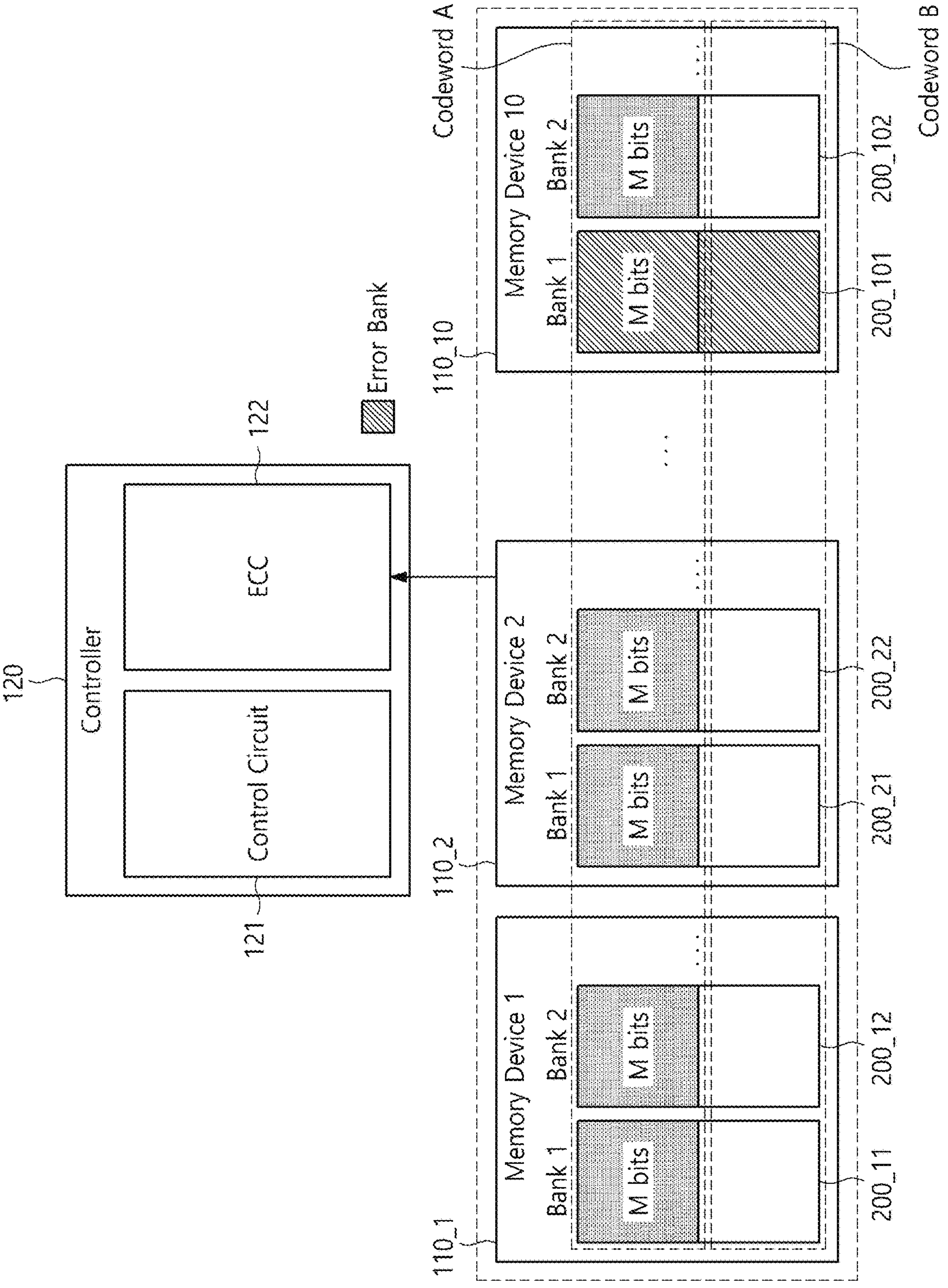
FIG. 7 is a diagram illustrating an operation of an error correction circuit included in a controller of a memory system illustrated in FIG. 5.

FIG. 7 is a diagram illustrating an operation of an error correction circuit included in a controller of a memory system illustrated in FIG. 5.

Referring to FIG. 7, a controller 120 may include an error correction circuit 122.

For example, the error correction circuit 122 may perform an operation of detecting an error in data read by a control circuit 121 and correcting the detected error. The error correction circuit 122 may use at least one of various error correction algorithms, and may perform correction of an error when the cause of the error is unclear.

For example, in FIG. 7 an error may occur in data read from a first bank 200_101 included in a tenth memory device 110_10 from among ten memory devices 110_1, 110_2, . . . , and 110_10 in the memory system 100. The corresponding error may be an error that occurs throughout the first bank 200_101 of the tenth memory device 110_10.

The controller circuit 121 may read M bits of data from the first bank 200_101 of the tenth memory device 110_10 and read M bits of data from a second bank 200_102 of the tenth memory device 110_10. Similarly, the controller circuit 121 may read M bits of data from each of two banks included in each of the ten memory devices 110_1, 110_2, . . . , and 110_10, and may configure a codeword A of 20 M bits.

Since the controller 120 configures the codeword A by driving the banks in the memory devices 110 in a distributed manner, data due to an error in the first bank 200_101 of the tenth memory device 110_10 may be M bits. In the 20 M bits of data obtained through the ten memory devices 110_1, 110_2, . . . , and 110_10, an error in M bits of data may be corrected using a parity.

Similarly, when a codeword B is configured on the basis of data read by the controller 120 from different parts of banks among a plurality of banks in each memory device 110, since data according to an error of the first bank 200_101 of the tenth memory device 110_10 is M bits, the error may be corrected using a parity included in the codeword B.

In this way, by correcting an error occurring in bank units through distributed driving of the banks included in the plurality of banks 200 in memory device 110, the operational performance of the memory system 100 may be improved.

The controller 120 may output only a single command, and distributed driving of banks included in the plurality of banks 200 may be implemented by internal operation of the memory devices 110.

Figure 8:
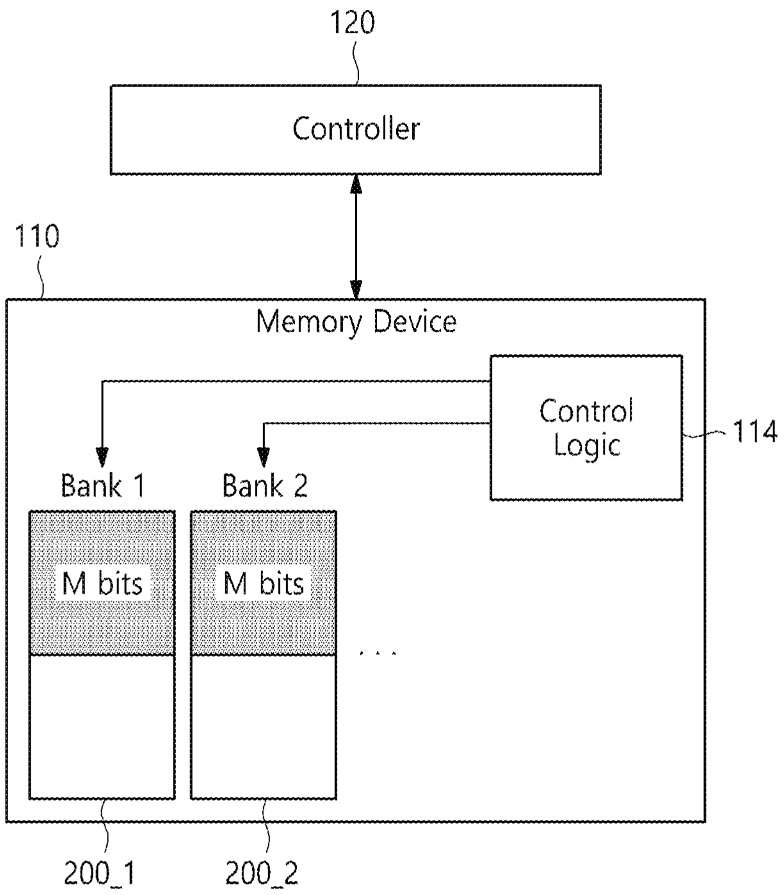
FIG. 8 is a diagram illustrating an operation of a control logic included in a memory device of a memory system illustrated in FIG. 5.

FIG. 8 is a diagram illustrating an operation of a control logic included in a memory device of a memory system illustrated in FIG. 5.

Referring to FIG. 8, an operation scheme of one memory device 110 among a plurality of memory devices included in a memory system 100 is illustrated as an example. A controller 120 may transmit a single command to the memory device 110. For example, the controller 120 may transmit one active command and one write or read command to the memory device 110.

A control logic 114 of the memory device 110 may operate a first bank 200_1 and a second bank 200_2 in response to the single command received from the controller 120. When the single command is a read command, the control logic 114 may read M bits of data by driving an M number of bit lines BL in the first bank 200_1. The control logic 114 may read M bits of data by driving an M number of bit lines BL in the second bank 200_2.

The memory device 110 may provide the M bits of data obtained from the first bank 200_1 and the M bits of data obtained from the second bank 200_2 to the controller 120. The controller 120 may merge data received from a plurality of memory devices, and may configure a codeword including a parity capable of correcting an error occurring in M bits of data obtained from each of the first bank 200_1 and the second bank 200_2.

Even when a codeword according to distributed driving of a plurality of banks 200 by a memory device 110 is provided, error correction may be performed by an error correction circuit 122 as described above with reference to FIG. 7.

Even when an error occurs in units of banks in a plurality of banks, since a parity capable of correcting an error in the data of corresponding bits is generated, error correction performance may be improved and the operational reliability of the memory system 100 may be improved.

Although various embodiments of the present disclosure have been described with particular specifics and varying details for illustrative purposes, those skilled in the art will appreciate that various modifications, additions and substitutions may be made based on what is disclosed or illustrated in the present disclosure without departing from the spirit and scope of the present disclosure as defined in the following claims.

What is claimed is:

1. A memory system comprising:

an N (where N is an integer satisfying N≥2) number of memory devices, each memory device including a first bank and a second bank that is paired with the first bank; and a controller configured to read M (where M is an integer satisfying M≥2) bits of first data from the first bank of each of the N number of memory devices, to read M bits of second data from the second bank of each of the N number of memory devices, and to process a codeword of 2·N·M bits, which is configured using the first data and the second data obtained from each of the N number of memory devices, wherein 2M bits of data is read from each of the N number of memory devices, and the first data and the second data are read from different banks included in each of the N number of memory devices.

2. The memory system according to claim 1, wherein the codeword of 2·N·M bits includes a parity of K (where K an integer satisfying K≥2) bits, and M is equal to or smaller than ½ of K.

3. The memory system according to claim 2, wherein K is smaller than 4 times M.

4. The memory system according to claim 2, wherein the controller corrects an error, using the parity of K bits, in the first data obtained from a first bank included in one of the N number of memory devices or the second data obtained from a second bank included in one of the N number of memory devices.

5. The memory system according to claim 1, wherein the codeword of 2·N·M bits includes L (where L is an integer satisfying L≥2) bits of metadata.

6. The memory system according to claim 1, wherein the controller separately transmits a first read command for reading the first data and a second read command for reading the second data to each of the N number of memory devices.

7. The memory system according to claim 6, wherein the controller transmits the first read command and the second read command in an interleaving scheme.

8. The memory system according to claim 1, wherein the controller separately transmits a first active command for an operation of the first bank and a second active command for an operation of the second bank to each of the N number of memory devices.

9. The memory system according to claim 1, wherein the controller obtains the first data and the second data in correspondence to a single command transmitted to each of the N number of memory devices.

10. The memory system according to claim 9, wherein each of the N number of memory devices performs precharge operations on the respective first banks and second banks in response to the single command.

11. A controller comprising:

a control circuit configured to output a first read command for a first bank included in each of an N (where N is an integer satisfying N≥2) number of memory devices and a second read command for a second bank included in each of the N number of memory devices, to pair the second bank and the first bank in each of the N number of memory devices, and to obtain M (where M is an integer satisfying M≥2) bits of first data corresponding to the first read command and M bits of second data corresponding to the second read command, wherein 2M bits of data is read from each of the N number of memory devices, and the first data and the second data are read from different banks included in each of the N number of memory devices; and an error correction circuit configured to correct an error in the first data obtained from the first bank included in one of the N number of memory devices or the second data obtained from the second bank included in one of the N number of memory devices, using a parity of K (where K is an integer satisfying K≥2) bits included in a codeword of 2·N·M bits, which is configured using the first data and the second data obtained from each of the N number of memory devices.

12. The controller according to claim 11, wherein K is at least two times M and is smaller than four times M.

13. The controller according to claim 11, wherein the codeword of 2·N·M bits includes L (where L is an integer satisfying L≥2) bits of metadata.

14. The controller according to claim 11, wherein the controller transmits the first read command and the second read command in an interleaving scheme.

15. The controller according to claim 11, wherein the control circuit separately transmits a first active command for an operation of the first bank and a second active command for an operation of the second bank to each of the N number of memory devices.

16. A memory device comprising:

a first bank including a plurality of first word lines, a plurality of first bit lines and a plurality of first memory cells; and a second bank paired with the first bank, and including a plurality of second word lines, a plurality of second bit lines and a plurality of second memory cells, wherein M (where M is an integer satisfying M≥2) bits of first data read from the first bank and M bits of second data read from the second bank are provided in response to a single command, wherein 2M bits of data is provided in response to the single command, and the first data and the second data are read from different banks.

17. The memory device according to claim 16, wherein in response to the single command, the first bank and the second bank are precharged and read operations on the first bank and the second bank are performed.

18. The memory device according to claim 16, wherein read operations on an M number of first bit lines and an M number of second bit lines are performed in response to the single command.

* * * * *